(12) United States Patent
Mugunda et al.

(10) Patent No.: US 11,483,348 B2
(45) Date of Patent: Oct. 25, 2022

(54) RESTRICTIVE USER PRIVILEGES

(71) Applicant: Dell Products L.P., Round Rock, TX (US)

(72) Inventors: Chandrasekhar Mugunda, Austin, TX (US); Prashanth Giri, Round Rock, TX (US)

(73) Assignee: Dell Products L.P., Round Rock, TX (US)

(*) Notice: Subject to any disclaimer, the term of this patent is extended or adjusted under 35 U.S.C. 154(b) by 212 days.

(21) Appl. No.: 16/814,733

(22) Filed: Mar. 10, 2020

(65) Prior Publication Data

US 2021/0289000 A1    Sep. 16, 2021

(51) Int. Cl.
*H04L 29/06* (2006.01)
*H04L 9/40* (2022.01)

(52) U.S. Cl.
CPC ............ *H04L 63/18* (2013.01); *H04L 63/101* (2013.01); *H04L 63/102* (2013.01); *H04L 63/205* (2013.01)

(58) Field of Classification Search
CPC ..... H04L 63/18; H04L 63/101; H04L 63/102; H04L 63/205
See application file for complete search history.

(56) References Cited

U.S. PATENT DOCUMENTS

| | | | | |
|---|---|---|---|---|
| 8,904,507 B2* | 12/2014 | Maity | ................ | H04L 63/0853 726/7 |
| 2009/0055301 A1* | 2/2009 | Drury | .................... | G06Q 40/00 705/35 |
| 2010/0325717 A1* | 12/2010 | Goel | ...................... | H04L 63/102 709/228 |
| 2011/0113474 A1* | 5/2011 | Chandolu | ........... | G06F 21/6218 726/4 |
| 2019/0057561 A1* | 2/2019 | Zavesky | ................ | G16H 40/67 |

FOREIGN PATENT DOCUMENTS

| | | | | | |
|---|---|---|---|---|---|
| CN | 104243419 | A | * | 12/2014 | |
| CN | 106982428 | A | * | 7/2017 | |
| CN | 109840414 | A | * | 6/2019 | |
| CN | 109861973 | A | * | 6/2019 | |
| EP | 2407907 | B1 | * | 3/2017 | ........... G06F 21/604 |
| EP | 3617917 | A1 | * | 3/2020 | ............ H04W 12/08 |

* cited by examiner

*Primary Examiner* — Kambiz Zand
*Assistant Examiner* — Afaq Ali
(74) *Attorney, Agent, or Firm* — Jackson Walker L.L.P.

(57) ABSTRACT

An information handling system may include a host system and a management controller configured to provide out-of-band management of the information handling system. The management controller may be configured to: receive, via a management bus of the management controller, a user login request for access to a first user account associated with the management controller; determine a second user account corresponding to the first user account, wherein the second user account is associated with a security policy; and provide the user access to the management controller via the first user account, wherein a privilege level of the provided access is based on a set of privileges associated with the second account.

15 Claims, 2 Drawing Sheets

RESTRICTIVE USER PRIVILEGES

TECHNICAL FIELD

The present disclosure relates in general to information handling systems, and more particularly to restricting user privileges for an account associated with a management controller based on user privileges associated with a security policy.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Many difficulties are known in the field of managing user privileges across different systems. For example, Intelligent Platform Management Interface (IPMI) provides one system for managing user logins in the context of management controllers such as baseboard management controllers (BMCs) and the like. Traditionally, BMC environments have implemented a restricted secure shell (SSH) login shell for IPMI users, which may be used to gate the users' access to the full system. However, some systems allow for the use of a special debug certificate, which grants full access to the BMC's root shell for that specific user irrespective of the actual privilege level associated with the login.

Also, there it may be desirable to realize a restricted (e.g., limited-access) secure file transfer protocol (SFTP) server implementation for different IPMI users on such BMC environments. For example, certain privileged users may be allowed to perform only "get" operations, whereas a user with administrator privileges may be allowed to perform all SFTP operations. Further, even in the case of a user with administrator privileges, it may be desirable to prevent access to any directories beyond the SFTP directory.

Accordingly, it may be desirable in some cases to base user privileges in one login domain on user privileges from some other login domain. As one example, a user login at a management controller (e.g., an IPMI user) can be associated with a user account, group, role, domain, etc. from a security policy (e.g., a security module such as Security-Enhanced Linux (SELinux)) that may be enforced at the management controller.

It is to be noted that various terms discussed herein are described in the Intelligent Platform Management Interface (IPMI) Specification Second Generation v2.0, Revision 1.1, released Oct. 1, 2013 (hereinafter, IPMI Specification), which is hereby incorporated by reference in its entirety. One of ordinary skill in the art with the benefit of this disclosure will understand its applicability to other specifications (e.g., prior or successor versions of the IPMI Specification). Further, some embodiments may be applicable to different technologies other than IPMI.

It is to be further noted that for the sake of concreteness and exposition, this disclosure describes in detail examples involving IPMI users and SELinux security policies. One of ordinary skill in the art with the benefit of this disclosure will understand its applicability to other types of systems as well.

It should be noted that the discussion of a technique in the Background section of this disclosure does not constitute an admission of prior-art status. No such admissions are made herein, unless clearly and unambiguously identified as such.

SUMMARY

In accordance with the teachings of the present disclosure, the disadvantages and problems associated with restricting user privileges may be reduced or eliminated.

In accordance with embodiments of the present disclosure, an information handling system may include a host system and a management controller configured to provide out-of-band management of the information handling system. The management controller may be configured to: receive, via a management bus of the management controller, a user login request for access to a first user account associated with the management controller; determine a second user account corresponding to the first user account, wherein the second user account is associated with a security policy; and provide the user access to the management controller via the first user account, wherein a privilege level of the provided access is based on a set of privileges associated with the second account.

In accordance with these and other embodiments of the present disclosure, a method may include, in an information handling system comprising a host system and a management controller configured to provide out-of-band management of the information handling system, the management controller receiving, via a management bus, a user login request for access to a first user account associated with the management controller. The method may further include the management controller determining a second user account corresponding to the first user account, wherein the second user account is associated with a security policy. The method may further include the management controller providing the user access to the management controller via the first user account, wherein a privilege level of the provided access is based on a set of privileges associated with the second account.

In accordance with these and other embodiments of the present disclosure, an article of manufacture may include a non-transitory, computer-readable medium having computer-executable code thereon that is executable by a processor of a management controller of an information handling system for: receiving, via a management bus, a user login request for access to a first user account associated with the management controller; determining a second user account corresponding to the first user account, wherein the second user account is associated with a security policy of the information handling system; and providing the user access to the management controller via the first user account, wherein a privilege level of the provided access is based on a set of privileges associated with the second account.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
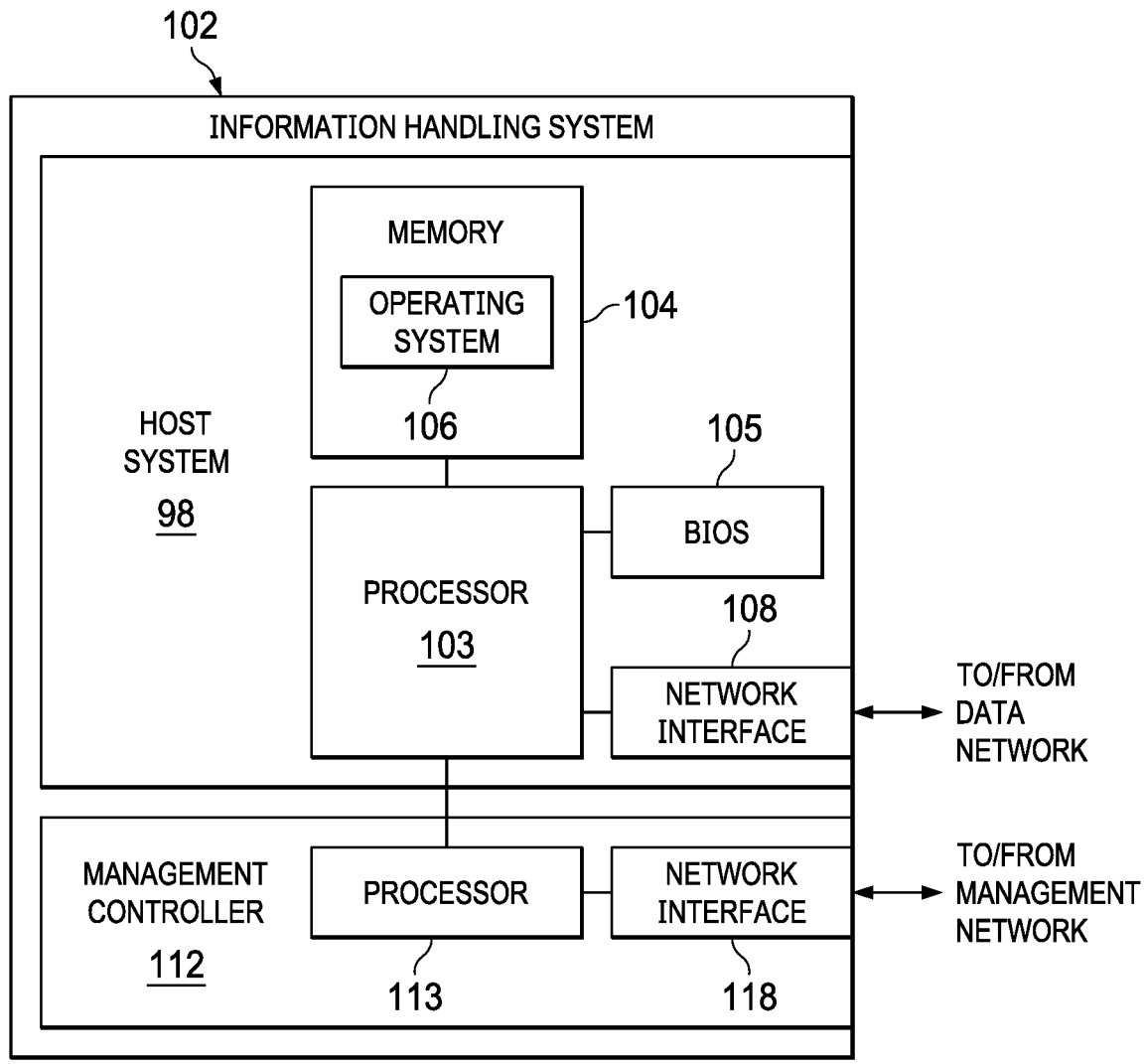
FIG. 1 illustrates a block diagram of an example information handling system, in accordance with embodiments of the present disclosure.
Figure 2:
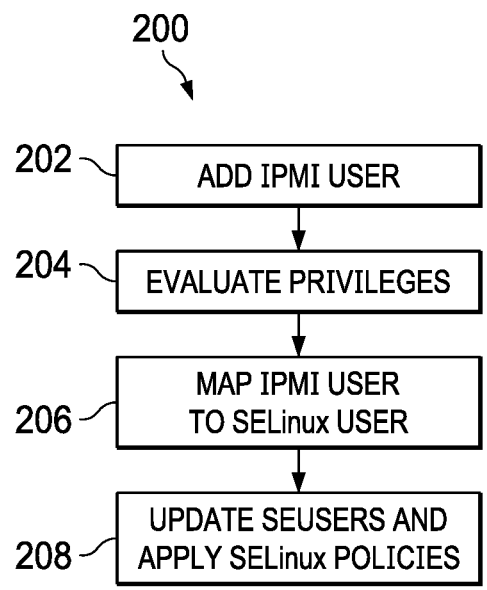
FIG. 2 illustrates an example flow diagram of a method in accordance with embodiments of the present disclosure.
Figure 3:
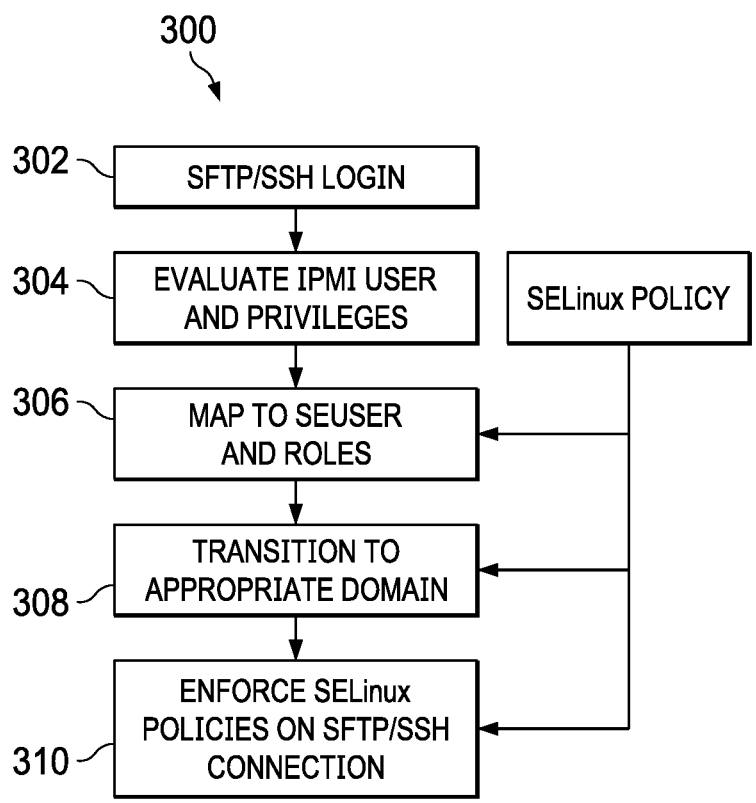
FIG. 3 illustrates an example flow diagram of a method in accordance with embodiments of the present disclosure.

Preferred embodiments and their advantages are best understood by reference to FIGS. 1 through 3, wherein like numbers are used to indicate like and corresponding parts. For the purposes of this disclosure, the term "information handling system" may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal digital assistant (PDA), a consumer electronic device, a network storage device, or any other suitable device and may vary in size, shape, performance, functionality, and price. The information handling system may include memory, one or more processing resources such as a central processing unit ("CPU") or hardware or software control logic. Additional components of the information handling system may include one or more storage devices, one or more communications ports for communicating with external devices as well as various input/output ("I/O") devices, such as a keyboard, a mouse, and a video display. The information handling system may also include one or more buses operable to transmit communication between the various hardware components.

For purposes of this disclosure, when two or more elements are referred to as "coupled" to one another, such term indicates that such two or more elements are in electronic communication or mechanical communication, as applicable, whether connected directly or indirectly, with or without intervening elements.

When two or more elements are referred to as "coupleable" to one another, such term indicates that they are capable of being coupled together.

For the purposes of this disclosure, the term "computer-readable medium" (e.g., transitory or non-transitory computer-readable medium) may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; communications media such as wires, optical fibers, microwaves, radio waves, and other electromagnetic and/or optical carriers; and/or any combination of the foregoing.

For the purposes of this disclosure, the term "information handling resource" may broadly refer to any component system, device, or apparatus of an information handling system, including without limitation processors, service processors, basic input/output systems, buses, memories, I/O devices and/or interfaces, storage resources, network interfaces, motherboards, and/or any other components and/or elements of an information handling system.

For the purposes of this disclosure, the term "management controller" may broadly refer to an information handling system that provides management functionality (typically out-of-band management functionality) to one or more other information handling systems. In some embodiments, a management controller may be (or may be an integral part of) a service processor, a baseboard management controller (BMC), a chassis management controller (CMC), or a remote access controller (e.g., a Dell Remote Access Controller (DRAC) or Integrated Dell Remote Access Controller (iDRAC)).

FIG. 1 illustrates a block diagram of an example information handling system 102, in accordance with embodiments of the present disclosure. In some embodiments, information handling system 102 may comprise a server chassis configured to house a plurality of servers or "blades." In other embodiments, information handling system 102 may comprise a personal computer (e.g., a desktop computer, laptop computer, mobile computer, and/or notebook computer). In yet other embodiments, information handling system 102 may comprise a storage enclosure configured to house a plurality of physical disk drives and/or other computer-readable media for storing data (which may generally be referred to as "physical storage resources"). As shown in FIG. 1, information handling system 102 may comprise a processor 103, a memory 104 communicatively coupled to processor 103, a BIOS 105 (e.g., a UEFI BIOS) communicatively coupled to processor 103, a network interface 108 communicatively coupled to processor 103, and a management controller 112 communicatively coupled to processor 103.

In operation, processor 103, memory 104, BIOS 105, and network interface 108 may comprise at least a portion of a host system 98 of information handling system 102. In addition to the elements explicitly shown and described, information handling system 102 may include one or more other information handling resources.

Processor 103 may include any system, device, or apparatus configured to interpret and/or execute program instructions and/or process data, and may include, without limitation, a microprocessor, microcontroller, digital signal processor (DSP), application specific integrated circuit (ASIC), or any other digital or analog circuitry configured to interpret and/or execute program instructions and/or process data. In some embodiments, processor 103 may interpret and/or execute program instructions and/or process data stored in memory 104 and/or another component of information handling system 102.

Memory 104 may be communicatively coupled to processor 103 and may include any system, device, or apparatus configured to retain program instructions and/or data for a period of time (e.g., computer-readable media). Memory 104 may include RAM, EEPROM, a PCMCIA card, flash memory, magnetic storage, opto-magnetic storage, or any suitable selection and/or array of volatile or non-volatile memory that retains data after power to information handling system 102 is turned off.

As shown in FIG. 1, memory 104 may have stored thereon an operating system 106. Operating system 106 may comprise any program of executable instructions (or aggregation of programs of executable instructions) configured to manage and/or control the allocation and usage of hardware resources such as memory, processor time, disk space, and input and output devices, and provide an interface between such hardware resources and application programs hosted by operating system 106. In addition, operating system 106 may include all or a portion of a network stack for network communication via a network interface (e.g., network interface 108 for communication over a data network. Although operating system 106 is shown in FIG. 1 as stored in memory 104, in some embodiments operating system 106 may be stored in storage media accessible to processor 103, and active portions of operating system 106 may be transferred from such storage media to memory 104 for execution by processor 103.

Network interface 108 may comprise one or more suitable systems, apparatuses, or devices operable to serve as an interface between information handling system 102 and one or more other information handling systems via an in-band network. Network interface 108 may enable information handling system 102 to communicate using any suitable transmission protocol and/or standard. In these and other embodiments, network interface 108 may comprise a network interface card, or "NIC." In these and other embodiments, network interface 108 may be enabled as a local area network (LAN)-on-motherboard (LOM) card.

Management controller 112 may be configured to provide management functionality for the management of information handling system 102. Such management may be made by management controller 112 even if information handling system 102 and/or host system 98 are powered off or powered to a standby state. Management controller 112 may include a processor 113, memory, and a network interface 118 separate from and physically isolated from network interface 108.

As shown in FIG. 1, processor 113 of management controller 112 may be communicatively coupled to processor 103. Such coupling may be via a Universal Serial Bus (USB), System Management Bus (SMBus), and/or one or more other communications channels.

Network interface 118 may be coupled to a management network, which may be separate from and physically isolated from the data network as shown. Network interface 118 of management controller 112 may comprise any suitable system, apparatus, or device operable to serve as an interface between management controller 112 and one or more other information handling systems via an out-of-band management network. Network interface 118 may enable management controller 112 to communicate using any suitable transmission protocol and/or standard. In these and other embodiments, network interface 118 may comprise a network interface card, or "NIC." Network interface 118 may be the same type of device as network interface 108, or in other embodiments it may be a device of a different type.

As discussed above, it may be desirable for a user logging in to management controller 112 (e.g., via an IPMI login) to have privileges that are dictated by a security policy established on management controller 112 (e.g., an SELinux policy).

Accordingly, a mapping of IPMI users to SELinux entities based on privilege levels (e.g., Administrator, Operator, Read-only and None) may be created in information handling system 102. Whenever an IPMI user logs into management controller 112 (e.g., via SSH or SFTP), the user's IPMI privilege levels may be evaluated, and the associated SELinux user and role context may take effect.

SELinux domains may be created corresponding to the SELinux roles, and policies may be set such that based on the SELinux user and roles, they will be transitioned into one of the specific domains. Table 1 below provides one example of a correspondence that may be established between IPMI user privileges, SELinux users, SELinux roles, and SELinux domains.

TABLE 1

| IPMI user privileges | SELinux user | SELinux role | SELinux domain |
|---|---|---|---|
| Read-only | readonly_u | readonly_r | readonly_t |
| Operator | operator_u | operator_r | operator_t |
| Administrator | unconfined_u | system_r unconfined_r | unconfined_t |

Restrictive access control may be implemented by SELinux policies that are based on the domain in which the user is running (which may depend on IPMI privileges). For example, all SSH users by default may be greeted by a restrictive shell. Upon applying a debug certificate (e.g., a field service debug (FSD) certificate), however, the user may be allowed access to the root shell of management controller 112. However, because the SELinux policies (based on privileges) are in effect, the operations that a lower-privileged user can perform are limited. Using embodiments of this disclosure, a fine-grained privilege-based controlled shell environment can be achieved.

As another example, SFTP connections may be managed in accordance with embodiments of this disclosure. Unlike the situation in which the SSH server itself handles the user's requests, a stand-alone SFTP server program (e.g., a binary) on the file system may be used to handle SFTP requests. This binary along with the restricted default shell may be assigned a specific set of SELinux policies, such that when an incoming SFTP connection from a specific user is detected, the restricted shell automatically launches the SFTP server in a separate SELinux domain based on the user's privileges.

The SFTP server running in the new domain may be provided with SELinux policies based on the user's access privileges. For example, a "Read-only" user may be allowed "get" operations but not "put" operations on the SFTP server. Similarly, an "Administrator" user may be allowed full permissions to "get" and "put" operations on the server. Accordingly, a jailed SFTP environment may be created for specific users based on privileges that are associated with a different environment (e.g., an IPMI login environment).

Turning now to FIG. 2, a flow chart is shown of an example method 200 for adding a new IPMI user, according to some embodiments.

At step 202, a request is received (e.g., at a management controller such as management controller 112) to add a new IPMI user. At step 204, the management controller may evaluate the privileges associated with the requested new IPMI user.

At step 206, the IPMI user may be mapped to an SELinux user (e.g., an existing SELinux user). For example, a mapping such as that shown above at Table 1 may be used in some embodiments.

At step 208, the seusers component of the SELinux module may be updated to reflect the new user association, and the corresponding SELinux policies may be applied to the new IPMI user. After step 208, method 200 may end.

Turning now to FIG. 3, a flow chart is shown of an example method 300 for accepting a user login, according to some embodiments.

At step 302, a login request is received from a user (e.g., an IPMI user). For example, the user may be attempting to login to an SFTP server, an SSH server, etc.

At step 304, the system may evaluate the IPMI user and its corresponding privileges. Based on SELinux policies, the IPMI user's privileges may be mapped to a user in a different context such as an SELinux user and one or more SELinux roles at step 306.

At step 308, the IPMI user login may be transitioned to the appropriate SELinux domain. At step 310, the appropriate SELinux policies may be enforced against the user's SFTP/SSH login session. For example, as discussed above with respect to Table 1, an IPMI user with "Read-only" privileges may correspond to an SELinux user "readonly_u", an SELinux role "readonly_r", and an SELinux domain "readonly_t". One of ordinary skill in the art with the benefit of this disclosure will understand the ways that any given embodiment may apply correspondences between IPMI user privileges and SELinux policies. After step 310, method 300 may end.

One of ordinary skill in the art with the benefit of this disclosure will understand that the preferred initialization point for the methods depicted in FIGS. 2-3 and the order of the steps comprising those methods may depend on the implementation chosen. In these and other embodiments, this method may be implemented as hardware, firmware, software, applications, functions, libraries, or other instructions. Further, although FIGS. 2-3 disclose a particular number of steps to be taken with respect to the disclosed methods, the methods may be executed with greater or fewer steps than those depicted. The methods may be implemented using any of the various components disclosed herein (such as the components of FIG. 1), and/or any other system operable to implement the method.

Although various possible advantages with respect to embodiments of this disclosure have been described, one of ordinary skill in the art with the benefit of this disclosure will understand that in any particular embodiment, not all of such advantages may be applicable. In any particular embodiment, some, all, or even none of the listed advantages may apply.

This disclosure encompasses all changes, substitutions, variations, alterations, and modifications to the exemplary embodiments herein that a person having ordinary skill in the art would comprehend. Similarly, where appropriate, the appended claims encompass all changes, substitutions, variations, alterations, and modifications to the exemplary embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

Further, reciting in the appended claims that a structure is "configured to" or "operable to" perform one or more tasks is expressly intended not to invoke 35 U.S.C. § 112(f) for that claim element. Accordingly, none of the claims in this application as filed are intended to be interpreted as having means-plus-function elements. Should Applicant wish to invoke § 112(f) during prosecution, Applicant will recite claim elements using the "means for [performing a function]" construct.

All examples and conditional language recited herein are intended for pedagogical objects to aid the reader in understanding the invention and the concepts contributed by the inventor to furthering the art, and are construed as being without limitation to such specifically recited examples and conditions. Although embodiments of the present inventions have been described in detail, it should be understood that various changes, substitutions, and alterations could be made hereto without departing from the spirit and scope of the disclosure.

What is claimed is:

1. An information handling system comprising:
a host system; and
a management controller configured to provide out-of-band management of the information handling system;
wherein the management controller is configured to:
receive, via a management bus of the management controller, a user login request from a particular user for access to a first user account associated with the management controller, wherein the first user account is an Intelligent Platform Management Interface (IPMI) account;
determine a second user account of the particular user, the second user account corresponding to the first user account, wherein the second user account is associated with a security policy, and wherein the second user account is a Security-Enhanced Linux (SELinux) user account; and
provide the particular user access to the management controller via the first user account, wherein a privilege level of the provided access is based on a set of privileges associated with the second account.

2. The information handling system of claim 1, wherein the login request is associated with a secure shell (SSH) server.

3. The information handling system of claim 1, wherein the login request is associated with a secure file transfer protocol (SFTP) server.

4. The information handling system of claim 1, wherein the security policy is a security policy of the management controller.

5. The information handling system of claim 1, wherein the privilege level is selected from the group consisting of administrator, operator, read-only, and none.

6. The information handling system of claim 1, wherein the management controller is further configured to:
receive a request to create a new user account associated with the management controller; and
create the new user account based on a privilege level of a designated user account that is associated with the security policy.

7. A method comprising:
in an information handling system comprising a host system and a management controller configured to provide out-of-band management of the information handling system:
the management controller receiving, via a management bus, a user login request from a particular user for access to a first user account associated with the management controller, wherein the first user account is an Intelligent Platform Management Interface (IPMI) account;
the management controller determining a second user account of the particular user, the second user account corresponding to the first user account, wherein the second user account is associated with a security policy, and wherein the second user account is a Security-Enhanced Linux (SELinux) user account; and
the management controller providing the particular user access to the management controller via the first user account, wherein a privilege level of the provided access is based on a set of privileges associated with the second account.

8. The method of claim 7, wherein the privilege level is selected from the group consisting of administrator, operator, read-only, and none.

9. The method of claim 7, further comprising:
receiving a request to create a new user account associated with the management controller; and
creating the new user account based on a privilege level of a designated user account that is associated with the security policy.

10. An article of manufacture comprising a non-transitory, computer-readable medium having computer-executable code thereon that is executable by a processor of a management controller of an information handling system for:
receiving, via a management bus, a user login request from a particular user for access to a first user account associated with the management controller, wherein the first user account is an Intelligent Platform Management Interface (IPMI) account;
determining a second user account of the particular user, the second user account corresponding to the first user account, wherein the second user account is associated with a security policy of the information handling system, and wherein the second user account is a Security-Enhanced Linux (SELinux) user account; and
providing the particular user access to the management controller via the first user account, wherein a privilege level of the provided access is based on a set of privileges associated with the second account.

11. The article of claim 10, wherein the login request is associated with a secure shell (SSH) server.

12. The article of claim 10, wherein the login request is associated with a secure file transfer protocol (SFTP) server.

13. The article of claim 10, wherein the security policy is associated with the management controller.

14. The article of claim 10, wherein the privilege level is selected from the group consisting of administrator, operator, read-only, and none.

15. The article of claim 10, wherein the code is further executable for:
receiving a request to create a new user account associated with the management controller; and
creating the new user account based on a privilege level of a designated user account that is associated with the security policy.

* * * * *